United States Patent
Yoshikawa et al.

[11] Patent Number: 6,038,361
[45] Date of Patent: Mar. 14, 2000

[54] LIGHT GUIDE SUPPORT MECHANISM AND SUPPORTING METHOD

[75] Inventors: Tsutomu Yoshikawa, Kawachinagano; Hideki Nagata, Sakai, both of Japan

[73] Assignee: Minolta Co., Ltd., Osaka, Japan

[21] Appl. No.: 08/997,870

[22] Filed: Dec. 24, 1997

[30] Foreign Application Priority Data

Dec. 27, 1996 [JP] Japan ................................ 8-350751

[51] Int. Cl.$^7$ .............................. G02B 6/00; G03B 21/00
[52] U.S. Cl. .......................... 385/134; 385/25; 385/136; 385/137; 385/138; 385/146; 385/147; 352/198
[58] Field of Search ............................ 385/25, 115, 116, 385/120, 121, 123, 134, 136, 137, 138, 148, 147; 352/198, 203, 242, 243

[56] References Cited

U.S. PATENT DOCUMENTS

| | | | |
|---|---|---|---|
| 3,512,861 | 5/1970 | Schackert | 385/116 X |
| 3,922,645 | 11/1975 | Camp et al. | 385/120 X |
| 3,987,299 | 10/1976 | Mulder | 385/120 X |
| 4,015,115 | 3/1977 | Corcoran | 385/116 X |
| 4,412,721 | 11/1983 | Saatze | 385/134 X |
| 4,441,785 | 4/1984 | Petrozello | 385/25 X |
| 4,529,986 | 7/1985 | D'Auria et al. | 385/25 X |
| 4,848,867 | 7/1989 | Kajioka et al. | 385/25 X |
| 4,898,447 | 2/1990 | Kuhlmann | 385/25 X |
| 5,337,379 | 8/1994 | Gieryng | 385/26 |
| 5,542,012 | 7/1996 | Fernandes et al. | 385/25 |

FOREIGN PATENT DOCUMENTS

| | | | |
|---|---|---|---|
| 4-29106 | 1/1992 | Japan | 385/88 X |
| 6-242359 | 9/1994 | Japan | 385/88 X |

*Primary Examiner*—Brian Healy
*Attorney, Agent, or Firm*—Burns, Doane, Swecker & Mathis, LLP

[57] ABSTRACT

A light guide support mechanism to minimize light transmission loss to the extent possible that houses a light guide in hollow cones such that each of the two end surfaces of the light guide protrudes from the windows of cover members fixed to either external end of the pair of hollow cones that are linked along their axis and that suspend the light guide in the empty spaces in the cones in a suspended state by means of relative rotation of the hollow cones such that the ridges of the light guide are in contact with the edges of the windows in the covers in a point-to-surface or edge-to-surface fashion.

19 Claims, 13 Drawing Sheets

LIGHT GUIDE SUPPORT MECHANISM AND SUPPORTING METHOD

This application is based on application No. 8-350751 filed in Japan, the content of which is hereby incorporated by reference.

BACKGROUND OF THE INVENTION

1. Field of the Invention

The present invention pertains to a light guide support mechanism, and more particularly to the support of a light guide having a rod-like configuration.

2. Description of the Related Art

Conventionally, rod-shaped light guides have been employed as light guides, i.e., light transmission elements, for various uses. These rod-shaped light guides are sometimes used for illumination, using their ability to emit light having an almost uniform luminance distribution via reflection inside the light guide.

Where a rod-shaped light guide is used for illumination as described above, in order to minimize the loss in light transmission, in some cases, a silver-deposition surface is formed on the outer circumference of the rod-shaped light guide, so that light emission from the outer circumference is prevented. However, light cannot be transmitted with high efficiency using this method because there is light transmission loss during reflection inside the light guide due to the internal reflective surface.

As an optical material offering highly efficient light transmission, optical fiber constructed of two layers having different densities is generally known. While optical fiber has the advantage of pliability, it has the disadvantages that (i) since it has a small diameter, the surfaces for light to enter and come out of the fiber are very small, and (ii) while the fiber may be used in a bundle, it is expensive to do so.

On the other hand, if a rod-shaped light guide is supported such that it is suspended in air, high-efficiency light transmission based on total reflection taking place due to the difference in density inside the rod-shaped light guide is possible, just as with optical fiber.

However, in order to support the rod-shaped light guide, it is necessary to make contact with the rod-shaped light guide, and the area of contact will not have total reflection, thereby causing a loss in light transmission.

SUMMARY OF THE INVENTION

The present invention provides a light guide support mechanism that supports a rod-shaped light guide by suspending it in the air such that light transmission loss is minimized to the extent possible.

In order to resolve the technical issues described above, the present invention provides a light guide support mechanism having the construction described below.

The light guide support mechanism has a pair of essentially cylindrical support members that can rotate coaxially relative to each other, a rod-shaped light guide housed in this pair of support members and aligned along their joint axis, and openings larger than the cross-section of this light guide cut perpendicular to its axis. In addition, the light guide support mechanism is also equipped with two windowed covers fixed to the openings located at the external ends of the pair of support members. When said light guide is supported in said support members, it has at least one pair of ridges that are (i) parallel to the joint axis of said pair of support members, (ii) equidistant from said joint axis, and (iii) located in a symmetrical fashion relative to this joint axis. Said windows in said pair of windowed covers are aligned perpendicularly relative to the joint axis of the support members, and they each have at least one pair of parallel edges whose distances from said joint axis are equal. These two windowed covers rotate in opposite directions relative to each other, and said light guide is supported when said pair of parallel edges are respectively in contact with said pair of ridges of said light guide.

In addition, when said light guide is mounted in said pair of support members so that its central axis is coterminous with the joint axis of said pair of support members, said light guide has two pairs of ridges that are (i) parallel to the joint axis of said pair of support members, (ii) equidistant from said joint axis, and (iii) located in a symmetrical fashion relative to said joint axis.

Each window of said two windowed covers has two pairs of parallel edges that are perpendicular to the joint axis of said pair of support members and are equidistant from said joint axis.

Said two windowed covers rotate in opposite directions relative to each other together with the pair of support members, and said light guide is supported when one of said pairs of parallel edges of said windows in said pair of windowed covers respectively come into contact with one pair of ridges of said light guide, and the other pair of parallel edges of said windows in said pair of windowed covers respectively come into contact with the other pair of ridges of said light guide.

The distance between said parallel edges of said windows in said pair of windowed covers is smaller than the distance between said pair of ridges of said light guide.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

The light guide support mechanisms pertaining to the various embodiments of the present invention shown in FIGS. 1 through 6 are explained below.

Figure 1:
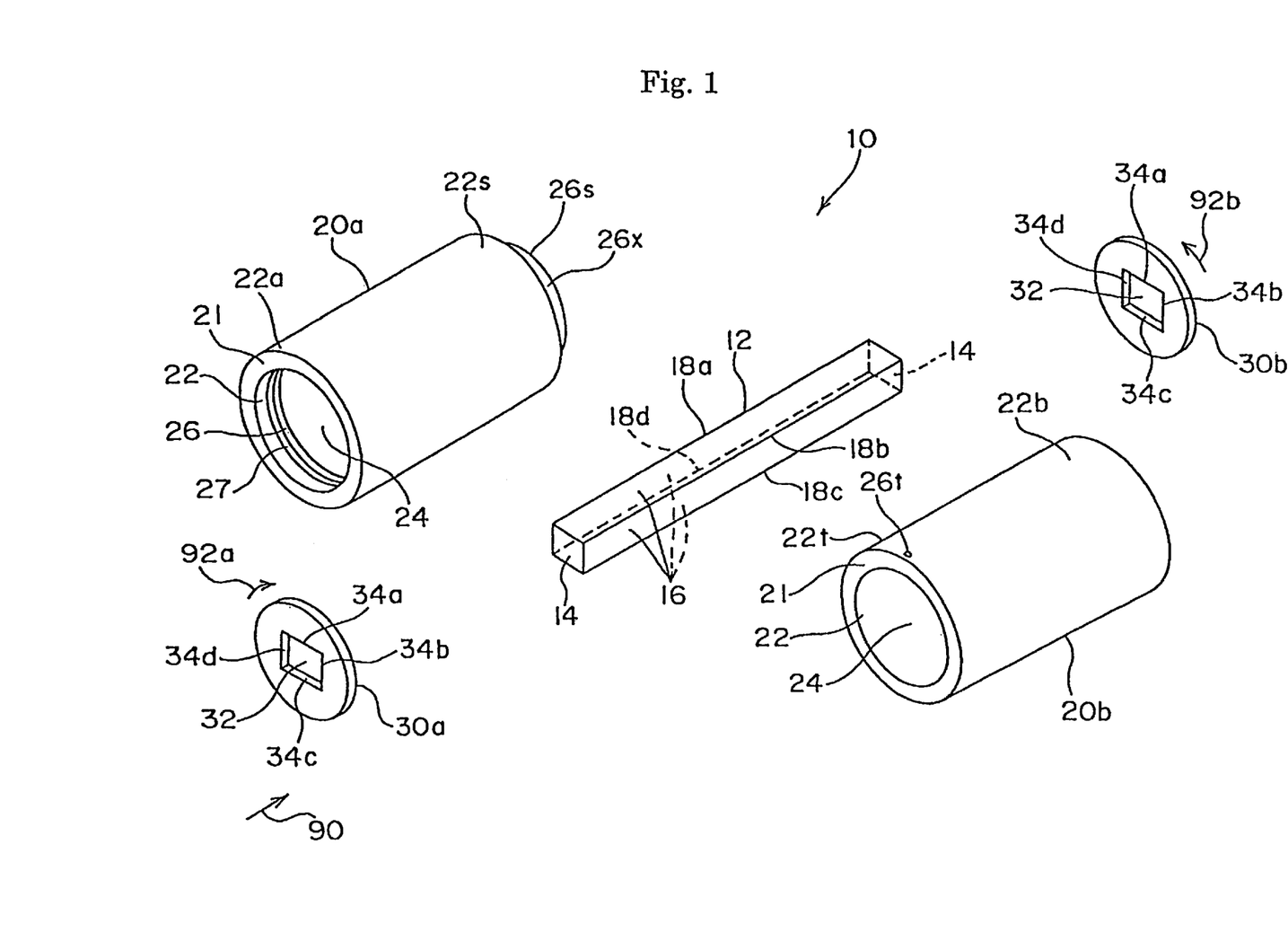
FIG. 1 is an exploded perspective view of the light guide support mechanism of a first embodiment of the present invention.
Figure 2:
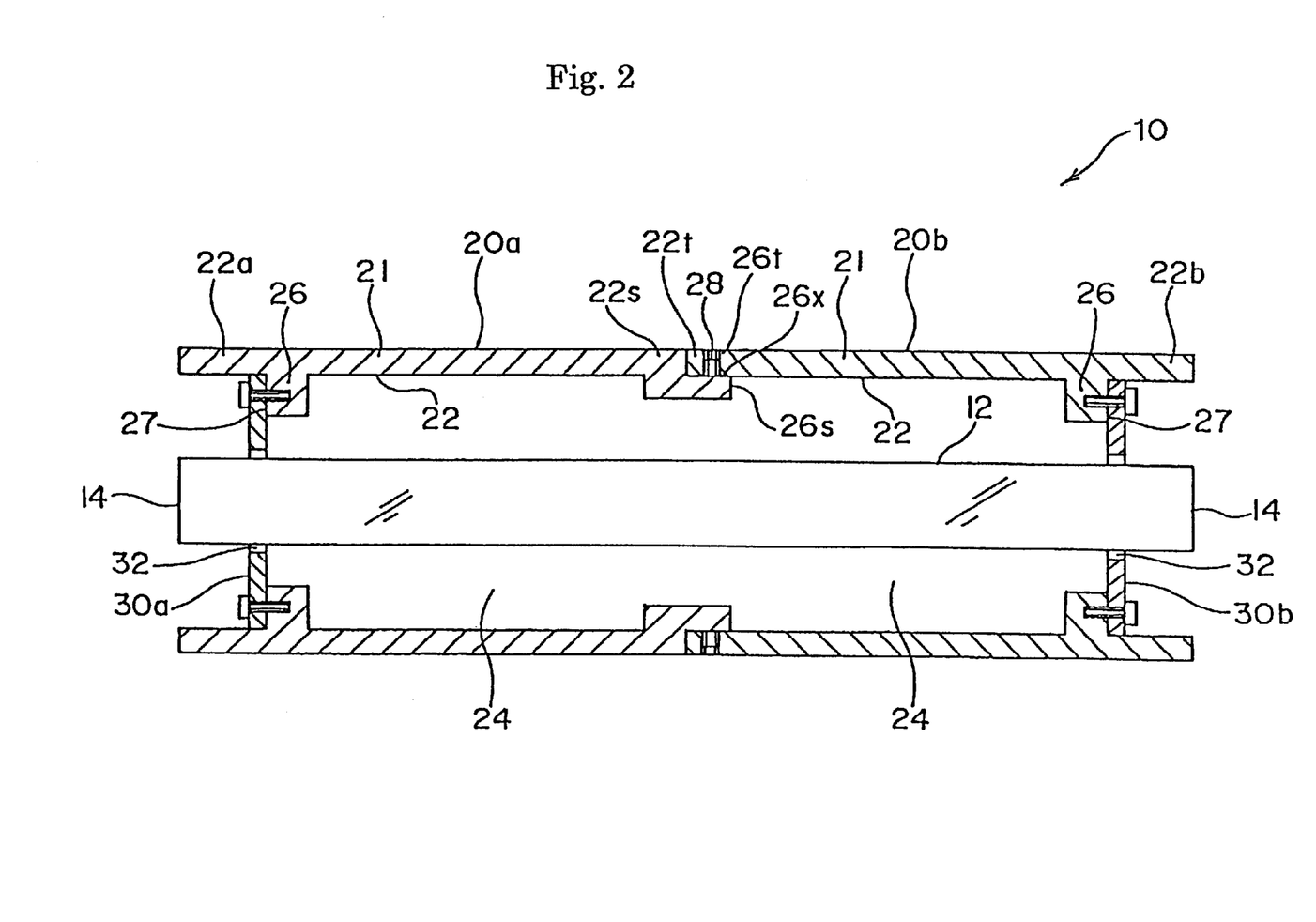
FIG. 2 is a cross-sectional view of the light guide support mechanism of FIG. 1.
Figure 3A:
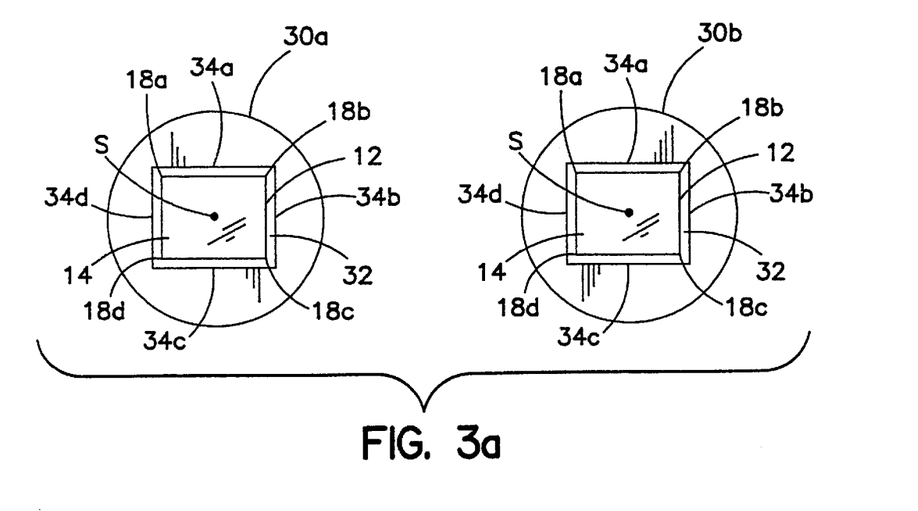
FIGS. 3(a) and 3(b) are diagrams to explain the light guide support mechanism of FIG. 1.
Figure 3B:
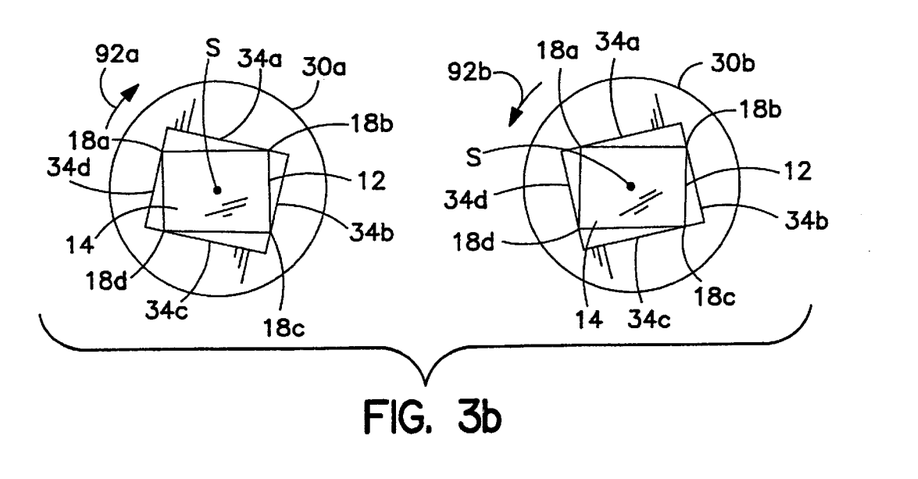

First, light guide support mechanism 10 of the first embodiment will be explained below with reference to FIGS. 1 through 3.

Support mechanism 10 houses rod-shaped light guide 12 in pair of cylindrical hollow cones 20a and 20b that are linked such that they can rotate relative to each other. Support mechanism 10 supports either end of light guide 12 that protrudes from windows 32 in covers 30a and 30b fixed to each end of cones 20a and 20b by rotating hollow cones 20a and 20b relative to each other. When this occurs, ridges 18a, 18b, 18c and 18d respectively come into contact with edges 34a, 34b, 34c and 34d of windows 32 in covers 30a and 30b, and light guide 12 is supported while being suspended in empty spaces 24 of cones 20a and 20b.

Pair of hollow cones 20a and 20b comprise first cone 20a and second cone 20b each having cylindrical side rim 21. Engagement member 26s is formed on one end 22s of first cone 20a. This engagement member 26s engages with inner circumferential surface 22 on one end 22t of second cone 20b, and cones 20a and 20b are linked such that they can rotate relative to each other around the same axis. Screw hole 26t that pierces side rim 21 is formed on the engaging end 22t of second cone 20b. Screw 28 is screwed into this screw hole 26t, and its tip penetrates outer circumferential surface 26x of engagement member 26s of first cone 20a, thereby fixing cones 20a and 20b in a connected state.

Light guide 12 is housed in empty spaces 24 in cones 20a and 20b. Light guide 12 is a right-angled parallelepiped, and its two end surfaces 14 and its cross-section perpendicular to its axis have identical rectangular shapes.

Protrusions 26 are formed on inner circumferential surfaces 22 of ends 22a and 22b that are opposite from engaging ends 22s and 22t of cones 20a and 20b. Covers 30a and 30b are each fixed to outer surface 27 of each protrusion 26. Covers 30a and 30b each have rectangular window 32 that is larger than end surface 14 and the cross-section of light guide 12 perpendicular to its axis. This window 32 is formed so that its center is intersected by axis S of cones 20a and 20b, as shown in FIG. 3(a). In other words, edges 34a and 34c of window 32 that face each other are equidistant from axis S, as are edges 34b and 34d that also face each other.

This support mechanism 10 supports light guide 12 through the relative rotation of cones 20a and 20b. In other words, beginning with the situation shown in FIG. 3(a), cone 20a and cover 32a are rotated clockwise relative to light guide 12 and cone 20b and cover 32b are rotated counterclockwise relative to light guide 12, as indicated by arrows 92a and 92b in FIG. 1 and FIG. 3(b), so that edges 34a, 34b, 34c and 34d of windows 32 in covers 30a and 30b respectively come into contact with ridges 18a, 18b, 18c and 18d of light guide 12.

As a result, light guide 12 is supported in the directions perpendicular to axis S of cones 20a and 20b by means of covers 30a and 30b. In addition, light guide 12 is prevented by cover 30a from rotating around axis S in counterclockwise direction 92b, and is prevented by cover 30b from rotating around axis S in clockwise direction 92a. Therefore, light guide 12 is supported in the most stable possible fashion. Further, because light guide 12 is supported such that its central axis intersects the center of windows 32, i.e., is coterminous with axis S of cones 20a and 20b, alignment of the central axis of light guide 12 with the optical axis may be easily and reliably performed.

As explained above, light guide 12 is supported by means of its ridges 18a, 18b, 18c and 18d coming into contact with windows 32a and 32b in covers 30a and 30b in either a point-to-surface or edge-to-surface fashion, and the light transmission loss attributable to the area of such contact is extremely small. Therefore, light guide support mechanism 10 can support light guide 12 with almost no light transmission loss.

Figure 4:
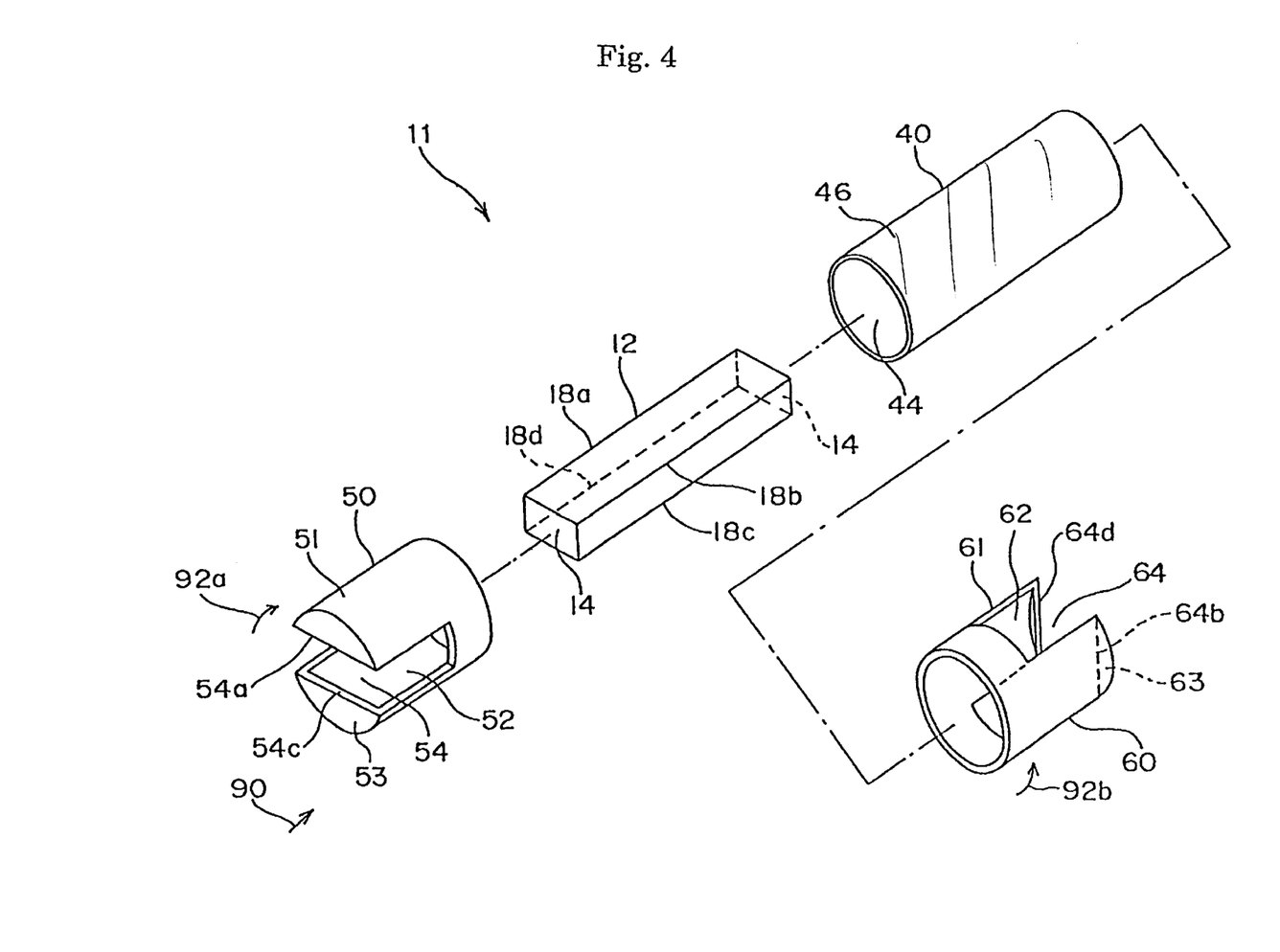
FIG. 4 is an exploded perspective view of the light guide support mechanism of a second embodiment of the present invention.
Figure 5:
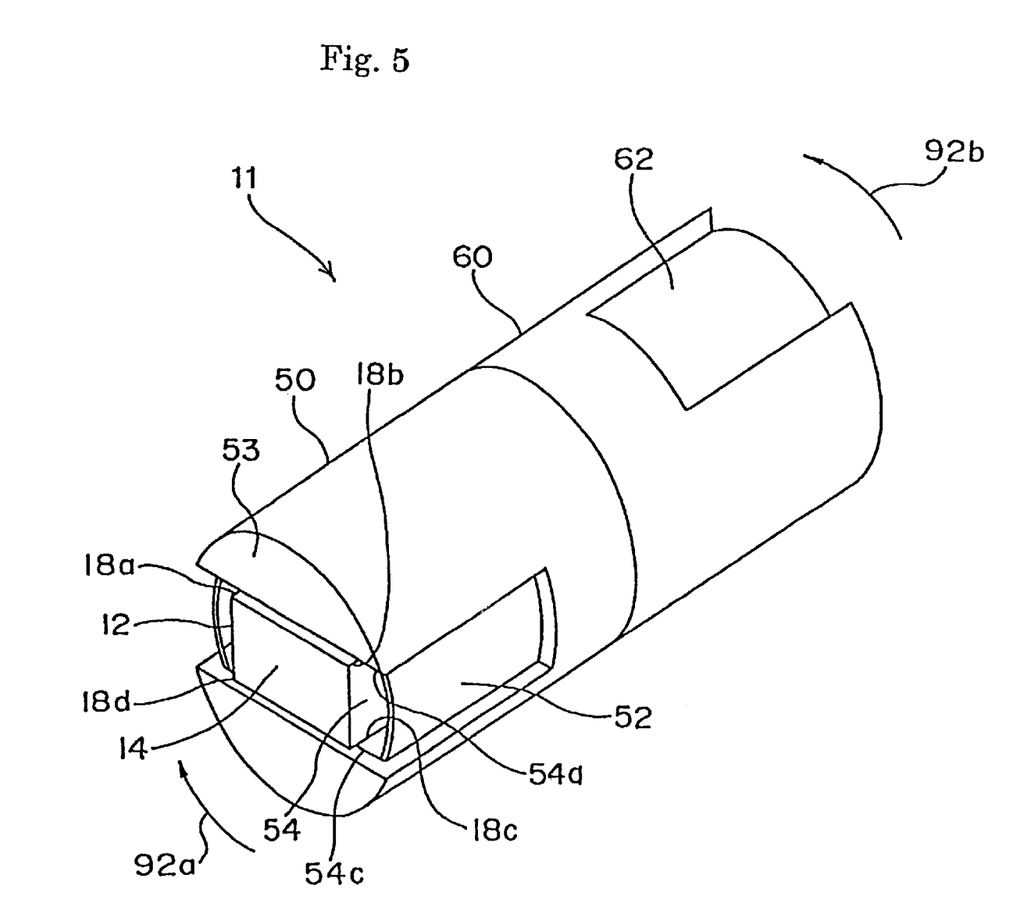
FIG. 5 is a perspective view of the light guide support mechanism of FIG. 4.
Figure 6A:
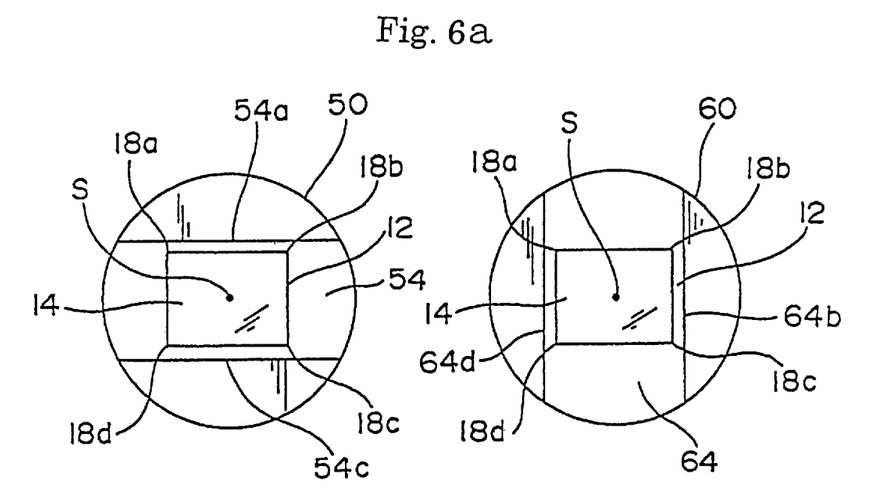
FIGS. 6(a) and 6(b) are diagrams to explain the light guide support mechanism of FIG. 4.
Figure 6B:
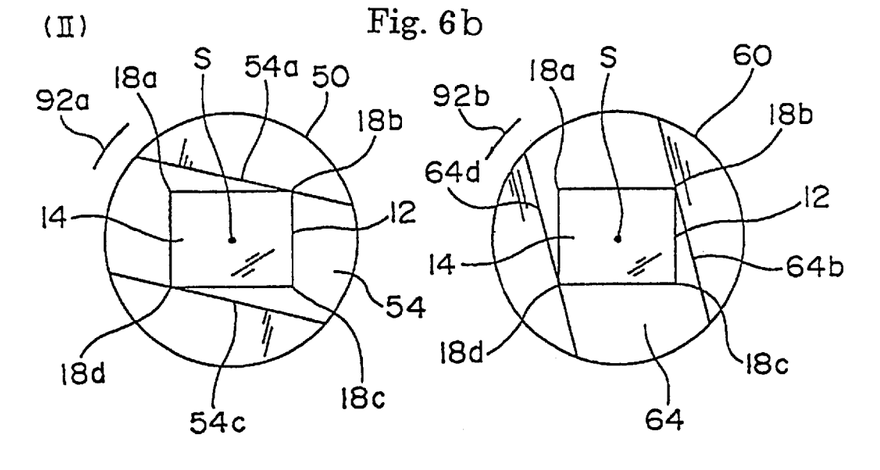

Light guide support mechanism 11 of the second embodiment will next be explained with reference to FIGS. 4 through 6.

Light guide support mechanism 11 supports light guide 12 essentially by means of pair of light guide support members 50 and 60 that are placed over either end of base cone 40 such that they can rotate relative to each other.

Specifically, base cone 40 has a cylindrical configuration with round openings at both ends, and light guide 12 is housed axially in empty space 44 of base cone 40. Light guide 12 is longer than and protrudes from both ends of base cone 40.

Light guide support members 50 and 60 are each placed over outer circumferential surface 46 at either end of base cone 40. Light guide support members 50 and 60 have cylindrical side rims 51 and 61, respectively. The ends of light guide support members 50 and 60 that are placed over base cone 40 are completely open, and their other ends have end rims 53 and 63, respectively. Notches 52 and 62 and openings 54 and 64 are formed in side rims 51 and 61 and end rims 53 and 63, respectively. The ends of light guide 12 protrude from openings 54 and 64. Openings 54 and 64 of light guide support members 50 and 60 respectively have parallel edges 54a and 54c and 64b and 64d that are wider than the longer edges and shorter edges of light guide 12, respectively. Edges 54a and 54c are equidistant from axis S of base cone 40, as are edges 64b and 64d.

This support mechanism 11 supports light guide 12 by means of the relative rotation of light guide support members 50 and 60. In other words, as shown in FIG. 6(a), where the central axis of light guide 12 is coterminous with axis S of base cone 40, light guide support member 50 is rotated clockwise relative to light guide 12 and light guide support member 60 is rotated counterclockwise relative to light guide 12, as indicated by arrows 92a and 92b in FIG. 4 and FIG. 6(b). When this occurs, edges 54a and 54c of opening 54 in light guide support member 50 respectively come into contact with ridges 18b and 18d of light guide 12, and edges 64b and 64d of opening 64 in light guide support member 60 respectively come into contact with ridges 18b and 18d of light guide 12. As a result, light guide 12 is supported in base cone 40 in directions perpendicular to axis S and is prevented from rotating around axis S. Therefore light guide 12 is supported in empty space 44 of base cone 40 in a suspended state.

When this occurs, light guide 12 is supported by means of the contact of its ridges 18b and 18d with openings 54 and 64 of light guide support members 50 and 60 in either a point-to-surface or edge-to-surface fashion, and the light transmission loss attributable to the area of such contact is extremely small. Therefore, light guide support mechanism 11 can support light guide 12 while causing almost no light transmission loss.

The present invention is not limited to the embodiments described above, and other embodiments are possible. For example, the light guide may have a multi-sided rod configuration, or may be supported in the direction of axis S.

Figure 7A:
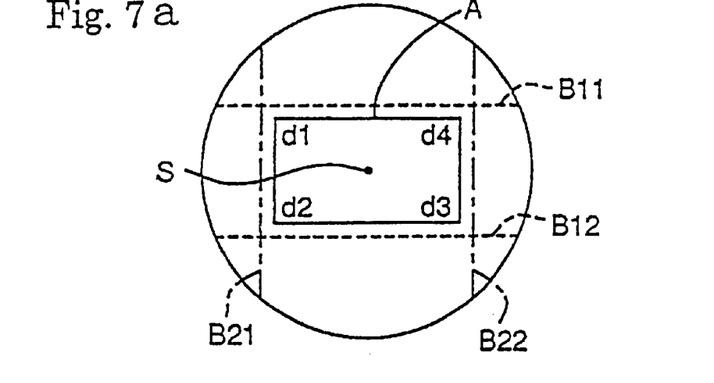
FIGS. 7(a), 7(b) and 7(c) are diagrams to explain the situation in which two ridges of the light guide come into contact with the window.
Figure 7B:
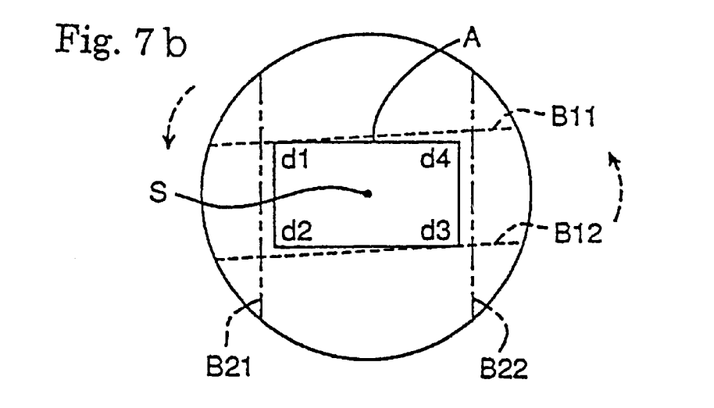
Figure 7C:
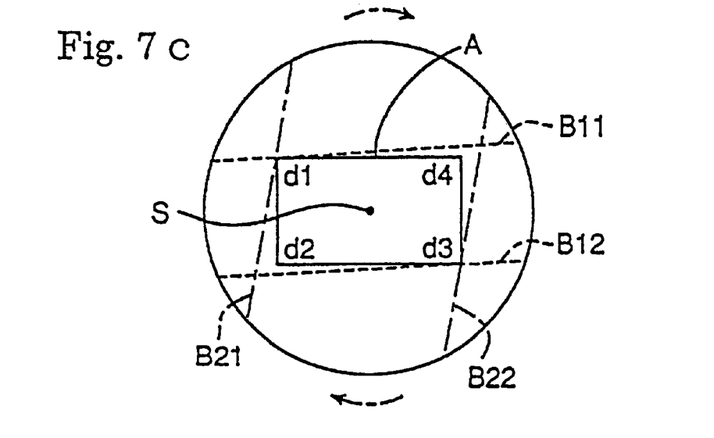
Figure 8A:
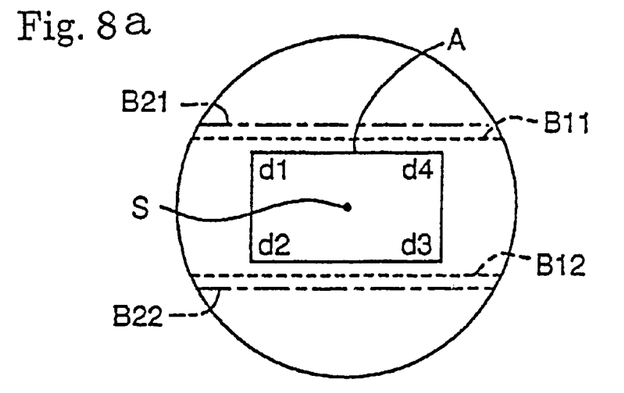
FIGS. 8(a), 8(b) and 8(c) are diagrams to explain the situation in which all four ridges of the light guide come into contact with the window.
Figure 8B:
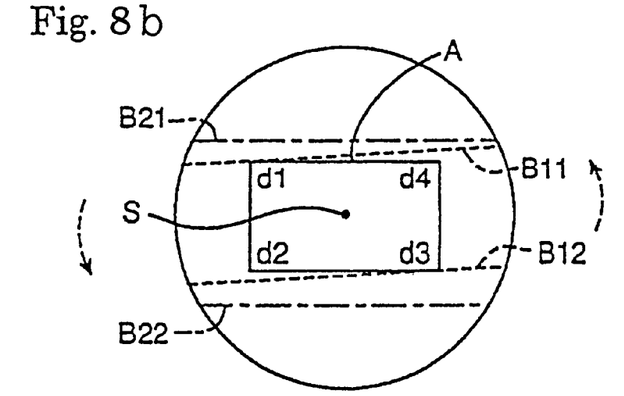
Figure 8C:
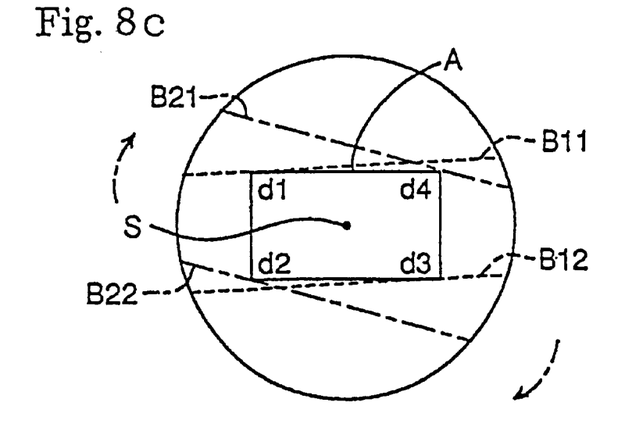
Figure 9A:
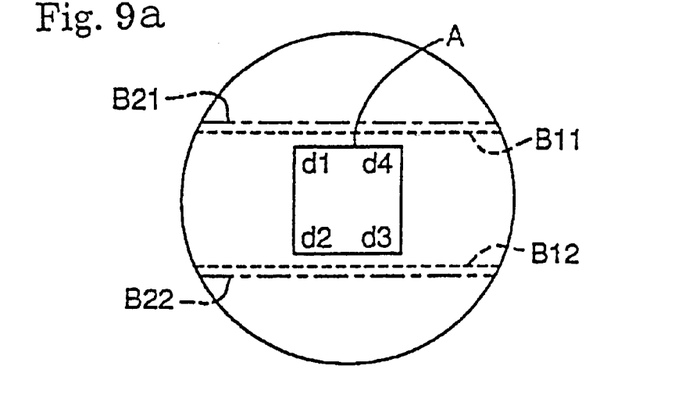
FIGS. 9(a), 9(b) and 9(c) are variations of FIGS. 8(a), 8(b) and 8(c). The cross-section of the light guide is square-shaped.
Figure 9B:
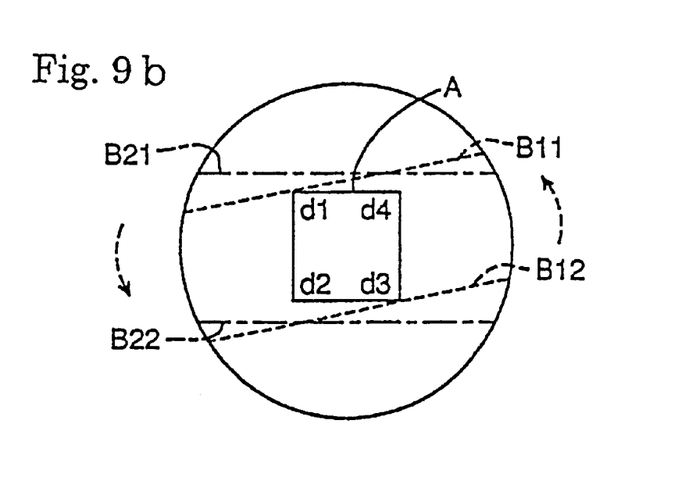
Figure 9C:
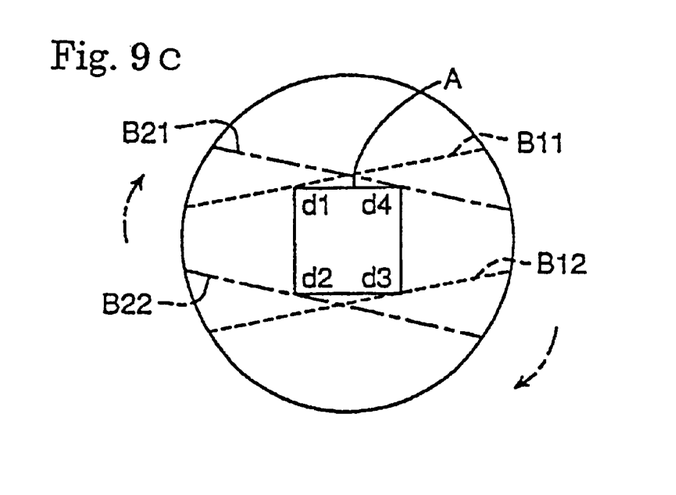
Figure 10:
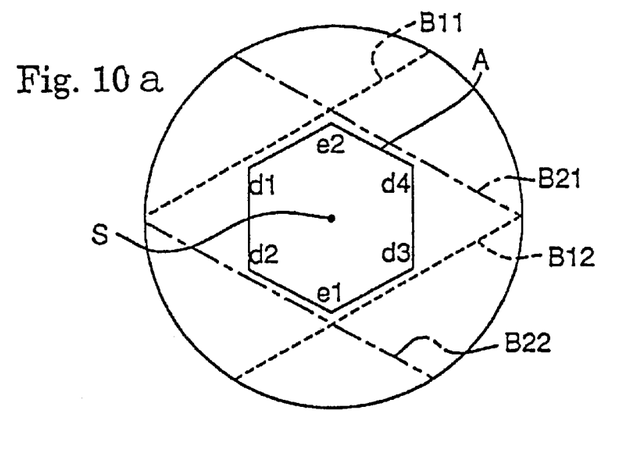
FIGS. 10(a), 10(b) and 10(c) are variations of FIGS. 8(a), 8(b) and 8 (c). The cross-section of the light guide is hexagonal.

As explained in detail with regard to the first and second embodiments described above, the pair of support members may be constructed such that they are supported by a common base member or such that they are directly linked so that they may rotate relative to each other in opposite directions. In addition, the support members and the windowed covers may be integrally constructed. Where such a pair of support members are rotated relative to each other, at least one pair of ridges of the light guide come into contact with the parallel edges of the windows in the covers at both ends. When this occurs, the light guide is prevented from moving in the cross-axial directions, i.e., in the directions along or perpendicular to the line diagonally connecting a pair of ridges of the light guide, and because the rotation of the light guide around the axis is prevented by the relative rotation of the pair of support members in opposite directions, the light guide can be supported in the support members in a suspended state. When this occurs, pairs of parallel edges B11/B12 and B21/B22 of the windows in the pair of windowed covers may be made to come into contact with the same pair of ridges d1 and d3 of light guide A, as shown in FIGS. 7(a), 7(b) and 7(c). Alternatively, different pairs of ridges d1/d3 and d2/d4 of light guide A may be made to come into contact with pairs of parallel edges B11/B12 and B21/B22 of the windows in the pair of windowed covers, as shown in FIGS. 8(a), 8(b) and 8(c). Moreover, the cross-section of light guide A need not be rectangular, but may be square, as shown in FIGS. 9(a), 9(b) and 9(c). Alternatively, the cross-section may be many-sided, for example hexagonal, as shown in FIGS. 10(a), 10(b) and 10(c). Because the contact between the light guide supported in the manner shown above and the windowed covers consists of point-to-surface contact or edge-to-surface contact, the amount of surface area used for said contact is extremely small.

Therefore, using this light guide support mechanism, a rod-shaped light guide may be supported in air in a suspended fashion with very little light transmission loss.

When said light guide is aligned in said pair of support members along the same axis as said pair of support members, it has two pairs of ridges located parallel to the axis of said pair of support members, as well as at the same distance from and symmetrical relative to said axis. Said windows in said pair of windowed covers have two pairs of parallel edges that are perpendicular to the axis of said pair of support members and are each equidistant from said axis relative to the other member of its pair. Said pair of windowed covers rotate in opposite directions relative to each other together with said pair of support members, and said light guide is supported when one of said pairs of parallel edges of said windows in said pair of windowed covers respectively come into contact with one of said pairs of ridges of said light guides, and the other pair of parallel edges of said windows in said pair of windowed covers respectively come into contact with the other of said pairs of ridges of said light guide.

Figure 13A:
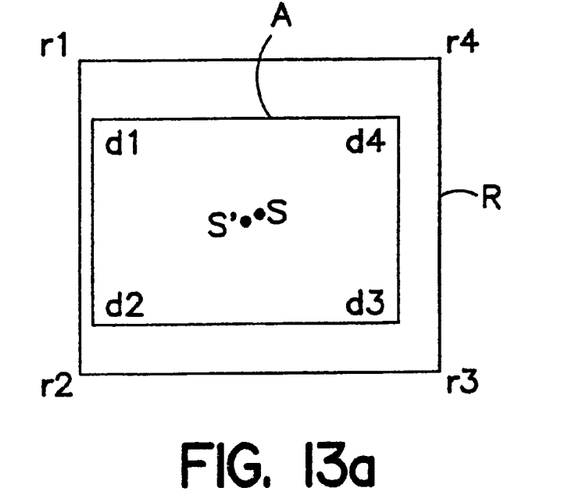
FIGS. 13(a) and 13(b) are diagrams to explain the support of the light guide.
Figure 13B:
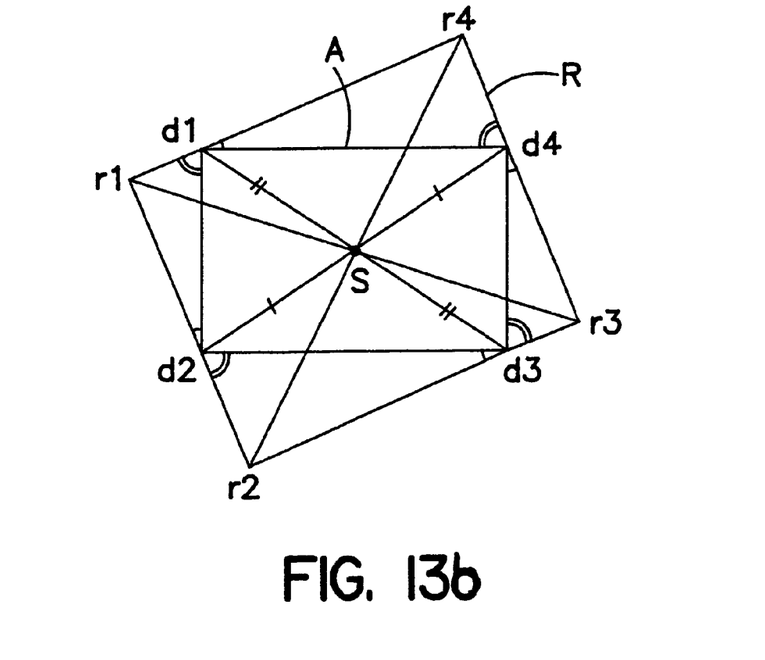

In the construction described above, because the two pairs of ridges of the light guide come into contact with the two pairs of parallel edges of the windows in the windowed covers, the light guide has four points of contact when viewing its cross-section perpendicular to the axis, and the central axis of the light guide intersects the centers of the windows in the pair of windowed covers. For example, even where central axis S' of light guide A having a rectangular cross-section d1-d2-d3-d4 does not intersect center S of rectangular window R in the windowed cover, as shown in FIG. 13 (a), if the windowed cover is rotated around center S of window R such that the four parallel edges of window R come into contact with the four points d1, d2, d3 and d4 of the light guide, respectively, as shown in FIG. 13(b), light guide A moves so that its central axis S' becomes aligned with center S of the windows. This is because (i) triangle r1-d1-d2 is congruent with triangle r3-d3-d4 because the angles of rotation of the parallel edges of window R are the same, (ii) triangle S-r1-d1 is congruent with triangle S-r3-d3 because the lengths of edge segments r1-d1 and r3-d3 are identical, (iii) length of edge segment S-d1 is identical to that of edge segment S-d3, and similarly, (iv) length of edge segment S-d2 is identical to that of edge segment S-d4. Therefore, adjustment of the position of the central axis of the light guide may be easily and reliably performed.

Specifically, the distances between said parallel edges of said windows in said pair of windowed covers are smaller than the distances between said pair of ridges of said light guide, and are larger than the smallest widths of said light guide along the directions essentially identical to the cross-axial directions linking said pair of ridges of said light guide.

Using the construction described above, because the distances between the parallel edges of the windows in the windowed covers are larger than the smallest widths of the light guide in the directions approximately equivalent to that of the cross-axial directions linking the pair of ridges of the light guide that should come into contact with the window, the light guide may be inserted into the window. On the other hand, because the distances between the parallel edges of the windows in the windowed covers are smaller than the distances between the pairs of ridges of the light guide that should come into contact with the window, when the window rotates relative to the light guide, the window can come into contact with the light guide.

Figure 11:
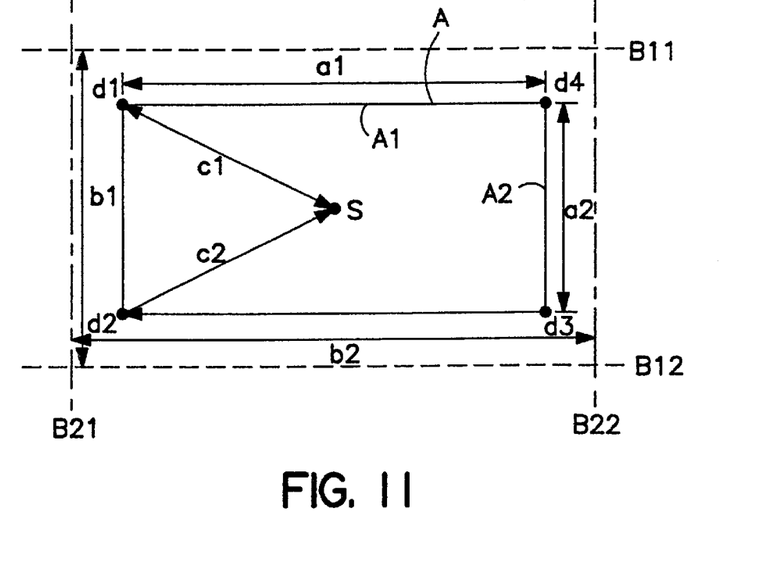
FIG. 11 is a diagram to explain the support of the light guide where the cross-section cut across the parallel edges is rectangular.

For example, in the example shown in FIG. 11, because distance b1 between parallel edges B11 and B12 of the window is larger than width a2 of the shorter edge of light guide A, and distance b2 between parallel edges B21 and B22 of the window is larger than width a1 of the longer edge of light guide A, light guide A may be inserted in the window. On the other hand, because distance b1 between parallel edges B11 and B12 is smaller than diagonal width 2×c1 between one pair of ridges d1 and d3 of light guide A, when the window rotates relative to light guide A, ridges d1 and d3 of the light guide can come into contact with parallel edges B11 and B12 of the window, respectively, as shown in FIG. 8(b). Similarly, because distance b2 between parallel edges B21 and B22 of the window is smaller than diagonal width 2×c2 between the other pair of ridges d2 and d4 of light guide A, ridges d2 and d4 of the light guide can come into contact with parallel edges B21 and B22 of the window, respectively, as shown in FIG. 10(c).

Figure 12:
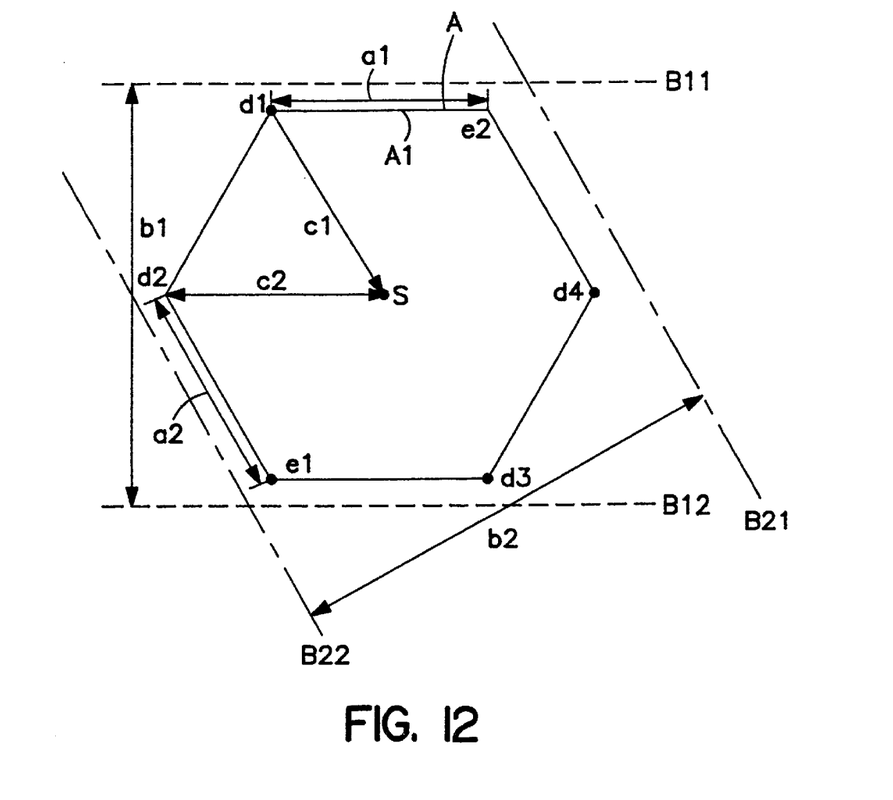
FIG. 12 is a diagram to explain the support of the light guide where the cross-section cut across the parallel edges is hexagonal.

Further, in the example shown in FIG. 12, because distance b1 between parallel edges B11 and B12 is larger than line d1-e1 linking ridges d1 and e1 of light guide A and line e2-d3 linking ridges e2 and d3 of light guide A and distance b2 between the other pair of parallel edges B21 and B22 of the window is larger than the smallest width of light guide A in the direction essentially equivalent to that of the diagonal line linking ridges d2 and d4 of light guide A that should come into contact with parallel edges B21 and B22 of the window, i.e., d2-e2 or e1-d4, light guide A can be inserted into the window. On the other hand, because distance b1 between parallel edges B11 and B12 is smaller than diagonal width 2×c1 between ridges d1 and d3 of light guide A that should come into contact with parallel edges B11 and B12 of the window, when the window rotates relative to light guide A, ridges d1 and d3 of the light guide can respectively come into contact with parallel edges B11 and B12 of the window, as shown in FIG. 10(b). Similarly, because distance b2 between the other pair of parallel edges B21 and B22 of the window is smaller than diagonal width 2×c2 between the other pair of ridges d2 and d4 of light guide A that should come into contact with parallel edges B21 and B22 of this window, ridges d2 and d4 of the light guide can respectively come into contact with parallel edges B21 and B22 of the window, as shown in FIG. 10(c).

Figure 14:
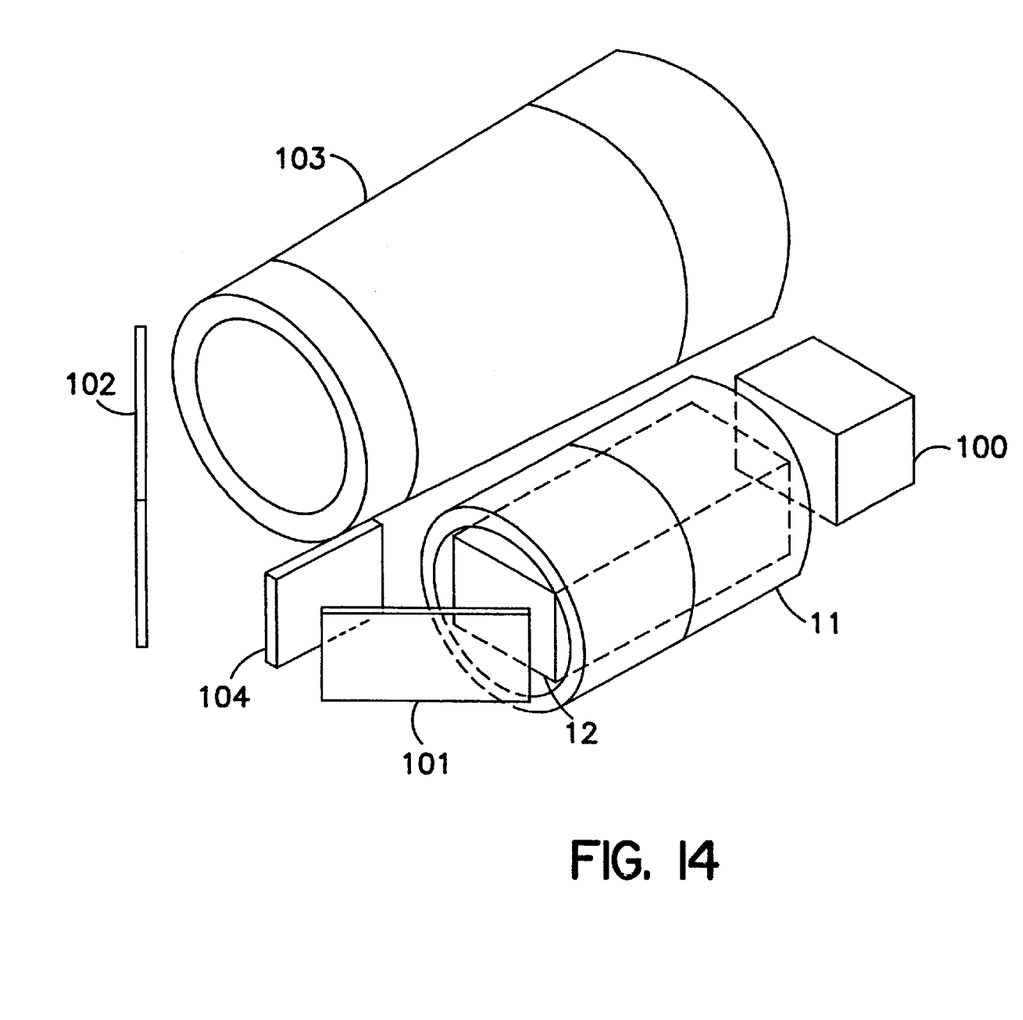
FIG. 14 shows an example in which the supported light guide is used in a projecting device.

FIG. 14 explains a projecting device comprising an application incorporating the light guide support mechanism of the present invention.

Light emitted from light source box 100 that passes through a light guide supported by light guide support member 11 strikes projecting lens 103 via a pair of reflecting mirrors 101 and 102. Light valve 104 comprising an LCD panel is placed between the pair of reflecting mirrors, and the image on the light valve is projected via the projecting lens. The light guide support mechanism of the present invention can also be used for the purpose of transmitting light in devices other than a projecting device.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. A light guide support mechanism, comprising:
   a rod-shaped light guide which transmits a light along an axis, said rod-shaped light guide having a pair of ridges paralleled to said axis and located in a symmetrical fashion relative to said axis;
   a pair of cylindrical support members that is rotatable coaxially relative to each other; and
   a pair of covers fixed to external ends of the pair of support members, said pair of covers having openings larger than the cross-section of the light guide which is cut in a plane perpendicular to said axis.

2. A light guide support mechanism according to claim 1, wherein said openings in said pair of covers are aligned perpendicularly relative to the axis, and said each opening has at least one pair of parallel edges, wherein said pair of covers rotates in opposite directions relative to each other, and said light guide is supported when said pair of parallel edges is respectively in contact with said pair of ridges of said light guide.

3. A light guide support mechanism according to claim 2, wherein said light guide has two pairs of ridges that are parallel to the axis, and located in a symmetrical fashion relative to said axis.

4. A light guide support mechanism according to claim 3, wherein each opening of said pair of covers has two pairs of parallel edges that are perpendicular to the axis and located in a symmetrical fashion relative to said axis.

5. A light guide support mechanism according to claim 4, wherein said pair of covers rotates in opposite directions relative to each other, and said light guide is supported when one of said pairs of parallel edges of said opening respectively come into contact with one pair of ridges of said light guide, and the other pair of parallel edges of said opening respectively come into contact with the other pair of ridges of said light guide.

6. A light guide support mechanism according to claim 5, wherein a distance between said parallel edges of said opening in said pair of covers is smaller than a distance between said pair of ridges of said light guide.

7. A light transmitting device comprising:
   a light guide which transmits light along an axis;
   a first member which supports the light guide with applying first force to the light guide, said first force being in a first rotating direction around the axis; and
   a second member which supports the light guide with applying second force to the light guide, said second force being in a second rotating direction which is opposite to the first direction.

8. A light transmitting device according to claim 7, wherein said light guide has a shape which is extended along said axis.

9. A light transmitting device according to claim 7, wherein said first member supports the light guide at one end thereof and said second member supports the light guide at the other end thereof.

10. A light transmitting device according to claim 7, wherein said first member has two surfaces which support the light guide.

11. A light transmitting device according to claim 10, wherein said light guide has two ridges which are in contact with said two surfaces.

12. A light transmitting device according to claim 7, wherein said light guide is a square pillar.

13. A light guide support mechanism comprising:
   a light guide which transmits light along an axis, and said light guide having two pairs of ridges which are parallel to said axis and located in a symmetrical fashion relative to said axis;
   first support surfaces which are in contact with one pair of ridges; and
   second support surfaces which are in contact with the other pair of ridges.

14. A light guide support mechanism according to claim 13, wherein said first support surfaces are rotatable around said axis relative to said second support surfaces.

15. A light guide support mechanism according to claim 14 further comprising:
   a first cylindrical support member which has said first support surfaces; and
   a second cylindrical support member which has said second support surfaces.

16. A light guide support mechanism according to claim 13, wherein said light guide is a square pillar.

17. A light guide support mechanism according to claim 13, wherein said light guide is hexagonal pillar.

18. A supporting method for supporting a light guide which transmits light along an axis, comprising the steps of:
   supporting the light guide with applying first force to the light guide, said first force being in a first rotating direction around the axis; and
   supporting the light guide with applying second force to the light guide, said second force being in a second rotating direction which is opposite to the first direction.

19. A projector comprising:
   a light guide which transmits light along an axis;
   a first member which supports the light guide with applying first force to the light guide, said first force being in a first rotating direction around the axis; and
   a second member which supports the light guide with applying second force to the light guide, said second force being in a second rotating direction which is opposite to the first direction.

* * * * *